United States Patent
Timmermans et al.

(10) Patent No.: US 8,940,843 B2
(45) Date of Patent: Jan. 27, 2015

(54) PUMP FOR LOOP REACTOR

(75) Inventors: Frank Timmermans, Schoten (BE); Wouter Ooms, Balen (BE); Daan Dewachter, Mechelen (BE); Louis Fouarge, Dilbeek (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 143 days.

(21) Appl. No.: 13/812,756

(22) PCT Filed: Jul. 29, 2011

(86) PCT No.: PCT/EP2011/063146
§ 371 (c)(1),
(2), (4) Date: Jan. 28, 2013

(87) PCT Pub. No.: WO2012/013804
PCT Pub. Date: Feb. 2, 2012

(65) Prior Publication Data
US 2013/0123442 A1    May 16, 2013

(30) Foreign Application Priority Data
Jul. 30, 2010  (EP) .................................... 10171364

(51) Int. Cl.
C08F 2/00        (2006.01)
B01J 19/18      (2006.01)
F04D 3/00       (2006.01)
C08F 10/02      (2006.01)
C08F 110/02    (2006.01)

(52) U.S. Cl.
CPC .............. *F04D 3/00* (2013.01); *B01J 19/1837* (2013.01); *C08F 10/02* (2013.01); *C08F 110/02* (2013.01)
USPC .......................................... 526/64; 422/132

(58) Field of Classification Search
CPC .............. C08F 10/02; C08F 2/14; C08F 2/01; C08F 110/02; C08F 2500/05; C08F 2500/24; B01J 19/1837; F04D 3/00
USPC .............................. 526/64; 416/341; 422/132
See application file for complete search history.

(56) References Cited

U.S. PATENT DOCUMENTS

| | | |
|---|---|---|
| 2003/0229187 A1 | 12/2003 | Kufeld et al. |
| 2007/0037937 A1 | 2/2007 | Damme |
| 2008/0119624 A1 | 5/2008 | Mihan et al. |

FOREIGN PATENT DOCUMENTS

| | | |
|---|---|---|
| WO | 2004/027264 A2 | 4/2004 |
| WO | WO 2004/027264 A2 * | 4/2004 |

OTHER PUBLICATIONS

"Axial Flow Circulator Pumps for Polyolefin Reactors", Lawrence Pumps, Inc., Dec. 31, 1993. Lawrence, MA.
Thad J. Michael et al., "Design of the ONR AxWJ-2 Axial Flow Water Jet Pump", Naval Surface Warfare Center Carderock Division Hydromechanics Department Report, NSWCCD-50-TR-2008/066, Nov. 2008.

* cited by examiner

Primary Examiner — William Cheung

(57) ABSTRACT

The present invention relates the use of a pump in a loop reactor for the production of polyethylene, as well as a reactor comprising such pump and methods for producing polyolefin by means of such reactor. The pump according to the invention is characterized in that it is an axial flow impeller circulation pump, wherein the impeller comprises 6 blades and wherein the pump is fixed on a spring supported frame. Use of the pump according to the present invention allows for preparation of homogeneous polyethylene products that meet high quality standards from the complicated ethylene polymerization mixtures while at the same time being produced with low energy consumption.

12 Claims, 3 Drawing Sheets

PUMP FOR LOOP REACTOR

CROSS-REFERENCE TO RELATED APPLICATIONS

This application claims the benefit of PCT/EP2011/063146, filed Jul. 29, 2011, which claims priority from EP 10171364.2, filed Jul. 30, 2010.

TECHNICAL FIELD OF THE INVENTION

The present invention relates to a reactor for producing polyolefin. The present invention specifically relates to the use of a pump in a loop reactor. In particular, the invention relates to the use of a pump having an impeller system designed for the displacement and continuous circulation of a slurry polymerization mixture in a loop reactor.

BACKGROUND OF THE INVENTION

Polyolefin such as polyethylene (PE) is synthesized by polymerizing olefin monomer such as ethylene ($CH_2=CH_2$) monomers. Because it is cheap, safe, stable to most environments and easy to be processed polyethylene polymers are useful in many applications. According to the properties polyethylene can be classified into several types, such as but, not limited to, LDPE (Low Density Polyethylene), LLDPE (Linear Low Density Polyethylene), and HDPE (High Density Polyethylene). Each type of polyethylene has different properties and characteristics.

Olefin polymerization such as ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the diluent residues are removed therefrom, the polymer product is dried, additives can be added and finally the polymer may be extruded and pelletized.

The inventors have found that there are numerous challenges in the production of high-yield and high-quality polyolefin such as polyethylene. They include adequate control of different reaction conditions such as temperature, pressure and flow rate. Effective design and maintenance of reactors are also required. The complex nature of the reaction slurry presents further complications. The slurry is for instance affected by the quantity and quality of ingredients or the homogeneity of the particulate polymerization catalyst dispersion which is prone to sedimentation in the slurry. Furthermore, high energy consumption needs to be avoided to lower production costs. In view of these challenges, there remains a need in the art for improved equipment to meet the rigorous requirements for high quality polyethylene production.

It is therefore the objective of the invention to provide a polyolefin polymerization reactor, in particular a slurry polymerization loop reactor for the production of polyolefin such as polyethylene, meeting high quality standards, wherein additionally energy consumption is optimized.

SUMMARY OF THE INVENTION

The inventors have surprisingly found that the above-mentioned drawbacks in the art can be overcome with the particular pump of the present invention which allows for preparation of homogeneous polyolefin products in particular polyethylene products that meet high quality standards from the complicated ethylene polymerization mixtures while at the same time being produced at low energy consumption.

Accordingly, the present invention in particular relates to the use of an axial pump for circulating an olefin polymerization slurry, preferably ethylene polymerization slurry comprising olefin monomer, preferably ethylene monomer, diluent and a polymerization catalyst through a loop reactor for the production of polyolefin preferably polyethylene, wherein said pump comprises an impeller consisting of 6 blades and wherein said pump is fixed on a spring supported frame.

In another embodiment, the present invention relates to a method for producing polyolefin in a loop reactor, comprising the steps of:
(a) feeding olefin monomer such as ethylene monomer, a diluent, and at least one polymerization catalyst to said loop reactor to produce a polymerization slurry;
(b) polymerizing said ethylene in said loop reactor to produce a polyolefin such as polyethylene,
wherein said slurry is circulated through said loop reactor by means of an axial pump comprising an impeller consisting of 6 blades and wherein said pump is fixed on a spring supported frame.

In another embodiment, the present invention relates to a loop reactor for the production of polyolefin such as polyethylene, wherein said reactor comprises
  a plurality of interconnected pipes defining a flow path for a polymerization slurry, said polymerization slurry comprising olefin monomer such as ethylene monomer, optionally one or more co-monomer(s), a polymerization catalyst, optionally an activating agent, and diluent;
  means for feeding monomer and diluent in the reactor;
  means for feeding polymerization catalyst in the reactor;
  optionally means for feeding an activating agent in the reactor; and
  a pump suitable for maintaining the polymer slurry in circulation in said reactor,
wherein said pump is an axial pump with an impeller consisting of 6 blades and wherein said pump is fixed on a spring supported frame.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION OF THE INVENTION

Figure 1:
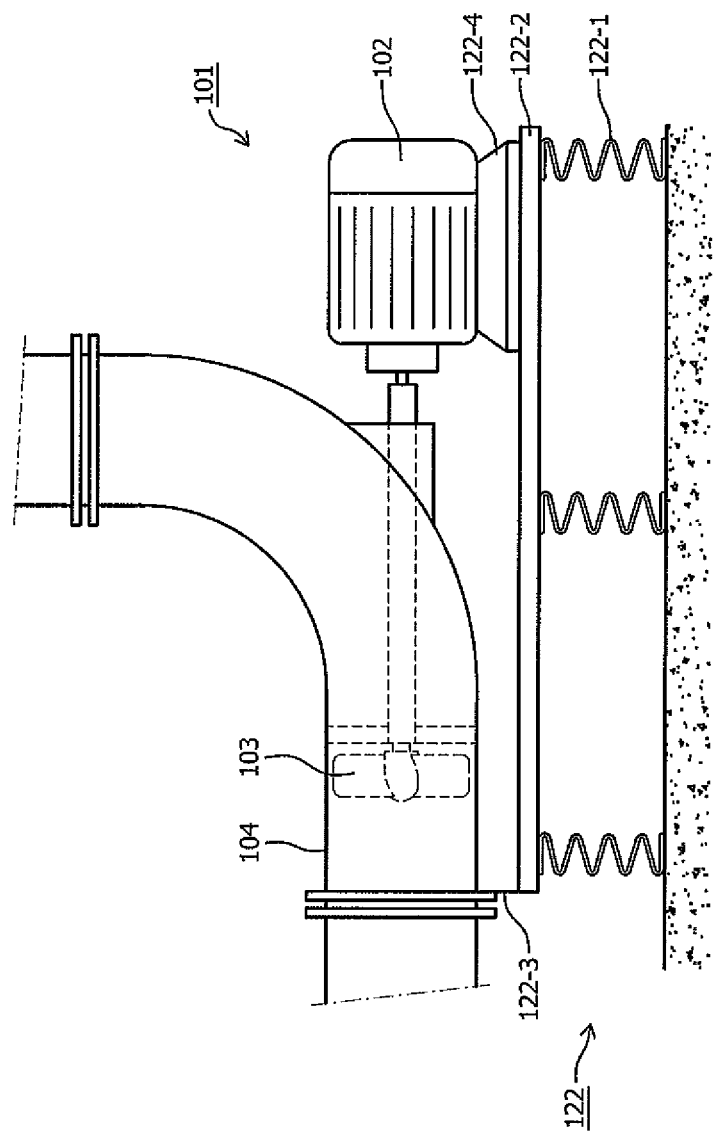
FIG. 1 schematically illustrates the details of a pump with a spring supported frame according to an embodiment of the present invention.

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +1-10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

According to the invention, an axial pump is used for circulating an olefin polymerization slurry, preferably an ethylene polymerization slurry comprising ethylene monomer, diluent and a polymerization catalyst through a loop reactor for the production of polyolefin such preferably polyethylene, wherein said pump comprises an impeller consisting of 6 blades and wherein said pump is fixed on a spring supported frame. In an embodiment said blades are made of inox.

As used herein, the term "axial pump" or "axial flow pump" refers to a impeller (or propeller) circulation pump comprising an impeller that is fixed onto a rotor shaft which is directly or indirectly (e.g. via magnetic coupling) driven by a motor, preferably an electromotor. Axial pumps allow fluid to enter the impeller axially and they discharge fluid nearly axially, circulating the liquid in a direction that is parallel to the rotor shaft.

According to an embodiment said impeller is fixed to a rotor shaft which is attached to a motor. According to a preferred embodiment of the invention, the impeller is fixed on one end of the rotor shaft inside the tube of a loop polymerization reactor. Preferably, the rotor shaft extends outwards, through the wall of the tube of the loop polymerization reactor, where it is connected to the motor at the other end of the shaft. Preferably, the shaft consists of a straight rod, preferably with rigid and direct orientation. Preferably, the pump shaft is at least partially surrounded by a sleeve. Preferably, the sleeve is connected to the reactor. Preferably, the sleeve is connected with the inner wall of the reactor on the end of the impeller. Preferably, the sleeve is connected with the reactor wall at the position where the shaft extends outwards through the reactor wall. Preferably, the shaft and sleeve ensure optimal alignment of the motor, the impeller and the reactor, and prevent relative movement between the motor, the impeller and the reactor.

As used herein, the term "blade" refers to a vane or airfoil of the impeller. A blade is a plate attached radially to a rotating drum, cylinder, or shaft. According to the invention, at least 5 blades, preferably 6 blades or more, are attached to the rotating shaft (i.e. the rotor shaft or impeller shaft) to collectively form the impeller, which moves a fluid by rotating. The blades can be fixed directly on the shaft or they can alternatively be fixed on a hub, which is positioned about the shaft. The impeller, shaft and motor are the components of the pump.

In a preferred embodiment, the blades of said impeller have a blade angle which is between 24° and 26°, more preferably between 24.5° and 25.5°, and most preferably about 25°. As used herein, the term "blade angle" refers to the angle which the chord line of the blade makes with the impeller's rotational plane (in the direction of the rotation) and is expressed in degrees, whereby the chord line is a straight line connecting the leading and trailing edges of the blade, whereby the leading and trailing edge of a blade are respectively the front and back of the blade in the direction of motion. Blade angle is also referred to as angle of attack or pitch angle.

Preferably, the pump of the invention operates at a speed, or the operational speed during the polymerization reaction or process, is between 1450 rpm (rotations per minute) and 1520 rpm, more preferably between 1470 rpm and 1500 rpm, and most preferably between 1480 rpm and 1490 rpm, for instance 1485 rpm.

The diameter of the impeller is preferably larger than 70% and smaller than 100% of the tube inner diameter of said loop reactor, more preferably larger than 80% and smaller than 100%, and most preferably larger than 90% and smaller than 100%. As used herein, the term "tube inner diameter" means the diameter of the tube which is bordered by the inner surface of the tube. It is the total tube diameter (or the distance between the opposing outer wall sections of the tube) minus two times the thickness of the wall of the tube.

Preferably, the impeller of said pump is located inside the tube of a loop reactor, more preferably just before a bend of the tube, i.e. upstream of a bend, relative to the flow direction.

Preferably, the blades and/or hub, and/or shaft are made from inox, alternatively referred to as stainless steel or corrosion-resistant steel.

According to the invention the pump is fixed on a spring supported frame. In an embodiment, said spring supported frame in firmly connected to the ground. Preferably, the spring supported frame comprises one or more springs, one or more frames, one or more connections to the reactor and one or more connections to the pump (preferably to the motor of the pump). Preferably, the connection to the reactor and the pump are rigid. Preferably, the springs are located below the frame. Preferably, the springs adjustably support the frame allowing for alignment with the underlying structure, for instance a floor. Preferably, the spring supported frame aligns the pump with the reactor path under varying circumstances, for instance the weight of the reactor, the weight of the pump and/or the changing temperature of the reactor or pump and/or prevent a change in physical orientation.

The present invention relates to the production of polyethylene. As used herein, the term "particulate polyethylene" refers to polyethylene particles or granules.

Preferably the present invention concerns the production of monomodal, or multimodal such as bimodal polyethylene. As used herein, "multimodal polyethylene" and "bimodal polyethylene" means polyethylene that consists of different polyethylene fractions, with different physicochemical and/or mechanical properties. By means of example, and without limitation, a bimodal polyethylene composition may comprise two polyethylene fractions with a different average or mean molecular weight, melt flow index and/or density.

Preferably, said polyethylene has a median particle diameter (d50) comprised between 10 and 400 µm, more preferably between 50 and 300 µm, and most preferably around 200 µm. The d50 is generally measured by laser diffraction analysis on a Malvern type analyser after having put the particles in suspension in a solvent such as e.g. cyclohexane and is defined as the particle size for which fifty percent by volume of the particles has a size lower than the d50.

In an embodiment, the density of said polyethylene is between 0.900 g/cm$^3$ and 0.975 g/cm$^3$, more preferably between 0.925 g/cm$^3$ and 0.950 g/cm$^3$.

Polyethylene is produced from an ethylene polymerization slurry. As used herein, the term "ethylene polymerization slurry" refers to a composition comprising ethylene monomer, catalyst solid particles, i.e. a solid or particulate catalyst, and a diluent. The solid particles can be suspended in the diluent. In the present invention it is especially applicable to solid particles of ethylene polymerization catalyst in a diluent. Hence, in an embodiment, the ethylene polymerization slurry refers to a mixture for homo-polymerization of ethylene monomer into polyethylene.

In an embodiment, said ethylene polymerization slurry further comprises one or more co-monomers. As used herein the term "co-monomer" refers to co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. Hence, in an embodiment, the ethylene polymerization slurry refers to a mixture for co-polymerization of ethylene monomer and co-monomer.

Diluents which are suitable for being used in accordance with the present invention are preferably liquid diluents which may comprise but are not limited to hydrocarbon diluents such as aliphatic, cycloaliphatic and aromatic hydrocarbon solvents, or halogenated versions of such solvents. The preferred diluent are C12 or lower, straight chain or branched chain, saturated hydrocarbons, C5 to C9 saturated alicyclic or aromatic hydrocarbons or C2 to C6 halogenated hydrocarbons. Nonlimiting illustrative examples of diluents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Preferably, the polymerization catalyst comprises a catalyst selected from the group consisting of metallocene catalysts, Ziegler-Matta catalysts and chromium catalysts, said catalyst being immobilized onto a solid inert carrier. By the term "solid particles" it is meant a solid provided as a collection of particles, such as for instance a powder or granulate. In the present invention it is especially applicable to a catalyst provided on a carrier or support. The support is preferably a silica (Si) support. The polymerization catalyst preferably has a mean particle diameter) d50) comprised between 1 µm and 100 µm, more preferably between 5 µm and 50 µm, and most preferably about 40 µm.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts or polymerization catalysts. In the present invention it is especially applicable to ethylene polymerization catalysts such as metallocene catalysts, chromium catalysts and/or Ziegler-Natta catalysts. Preferably, said polymerization catalyst comprises a catalyst selected from the group consisting of metallocene catalysts, Ziegler-Natta catalysts and chromium catalysts, said catalyst being immobilized onto a solid inert carrier In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of polyethylene has various advantages. Metallocene catalysts have high activities and are capable of preparing polymers with enhanced physical properties. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

(Ar)$_2$MQ$_2$                                                                           (I); or

R"(Ar)$_2$MQ$_2$                                                                      (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl)zirconium dichloride (Cp$_2$ZrCl$_2$), bis(cyclopentadienyl)titanium dichloride (Cp$_2$TiCl$_2$), bis(cyclopentadienyl)hafnium dichloride (Cp$_2$HfCl$_2$); bis(tetrahydroindenyl)zirconium dichloride, bis(indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, diphenylmethylene(cyclopentadienyl)(fluoren-9-yl)zirconium dichloride, and dimethylmethylene [1-(4-tert-butyl-2-methyl-cyclopentadienyl)](fluoren-9-yl)zirconium dichloride.

The catalysts can be provided on a solid support. The support should be an inert solid, which is chemically unreactive with any of the components of the conventional metallocene catalyst. The support or carrier is an inert organic or inorganic solid, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support.

In a preferred embodiment, a polymerization catalyst applied in the present polymerisation process is a supported metallocene-alumoxane catalyst consisting of a metallocene and an alumoxane which are bound on a porous silica support.

In another embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to CrSiO$_2$ or CrAl2O$_3$.

In another embodiment of the present invention, said catalyst is a Ziegler-Natta catalyst. The term "Ziegler-Natta catalyst" or "ZN catalyst" refers to catalysts having a general formula M$^1$X$_v$, wherein M$^1$ is a transition metal compound selected from group IV to VII, wherein X is a halogen, and wherein v is the valence of the metal. Preferably, M$^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to TiCl$_3$, TiCl$_4$. Suitable ZN catalysts for use in the invention are described in U.S. Pat. Nos. 6,930,071 and 6,864,207, which are incorporated herein by reference.

In another embodiment, the present invention relates to a method for producing polyolefin such aspolyethylene in a loop reactor, comprising the steps of:
(a) feeding olefin monomer such as ethylene monomer, a diluent, and at least one polymerization catalyst to said loop reactor to produce a polymerization slurry;
(b) polymerizing said ethylene in said loop reactor to produce polyolefin such as polyethylene;

wherein said slurry is circulated through said loop reactor by means of an axial pump comprising an impeller consisting of 6 blades, wherein said pump is fixed to a spring supported frame.

In a preferred embodiment, additionally one or more co-monomer is fed to the loop reactor for the production of polyethylene co-polymers. In another preferred embodiment, additionally hydrogen is fed to the loop reactor.

Preferably, the polymerization slurry is circulated at a flow rate (i.e. the volumetric flow rate or rate of fluid flow) of from 4500 m$^3$/h to 6000 m$^3$/h, more preferably from 5000 m$^3$/h to 5500 m$^3$/h, and most preferably about 5250 m$^3$/h.

In a further embodiment, the loop reactor has a pressure of from 35 barg (equivalent to 36 bar, wherein barg is defined as bar+1) to 65 barg (equivalent to 66 bar), more preferably from 40 barg to 50 barg, most preferably from 40 barg and 45 barg, for example around 42 barg. In a further embodiment, the pressure in said loop reactor during operation is at least 40 barg. As used herein, the term "berg" refers to "bar gauge" or "gauge pressure". Barg is zero referenced against ambient air pressure, so it is equal to absolute pressure minus atmospheric pressure. 1 barg is equivalent to 2 bar.

A further aspect of the invention relates to a loop reactor for the production of polyolefin such as polyethylene, wherein said reactor comprises an axial pump with an impeller comprising at least 5 blades, preferably 6 blades or more, for circulating ethylene polymerization slurry, wherein said pump is fixed to a spring supported frame. In a preferred embodiment, said blades are in inox.

As used herein, the term "loop reactor" refers to a closed circuit tubular polymerization reactor for the production of polyethylene. These reactors consist of a long pipe, arranged in two loops. Loop reactors are generally known in the art. The loop reactors as described herein are liquid full reactors and are—essentially—free of a gaseous phase while in operation.

Specifically, the invention relates to a loop reactor for the production of polyolefin such as polyethylene, wherein said reactor comprises
 a plurality of interconnected pipes defining a flow path for a polymerization slurry, said polymerization slurry comprising ethylene monomer, optionally one or more co-monomer(s), a polymerization catalyst, optionally an activating agent, and diluent;
 means for feeding monomer and diluent in the reactor;
 means for feeding polymerization catalyst in the reactor;
 optionally means for feeding an activating agent in the reactor; and
 a pump suitable for maintaining the polymer slurry in circulation in said reactor,
 wherein said pump is an axial pump with an impeller consisting of 6 blades and wherein said pump is fixed on a spring supported frame.

In an embodiment, said loop reactor has a tube diameter between 0.3 and 0.7 meter, preferably between about 0.4 and 0.6 meter, more preferably between 0.45 m and 0.55 meter, and most preferably around 0.5 meter.

Preferably, the loop reactor has a linear path between 80 and 140 meter, more preferably between 95 and 125 meter, and most preferably about 110 meter. As used herein, the term "linear path" or "linear flow path" means the total length of the tube of the loop reactor measured along the central axis of the tube. As such, it refers to the distance that a fluid, in particular a polymerization slurry, travels, when circulated, between two consecutive passages of any given point in the reactor.

FIG. 1 schematically illustrates part of a polymerization reactor with a pump and a spring supported frame according to an embodiment of the present invention. Pump 101 comprises a motor 102 connected with a shaft to six bladed impeller 103 which is located in reactor pipe 104. Spring supported frame 122 comprises springs 122-1, a frame 122-2, a reactor connection 122-3 and a motor connection 122-4. Springs 122-1 are located below frame 122-2 and are connected to the bottom of frame 122-2 and to the floor.

Figure 2:
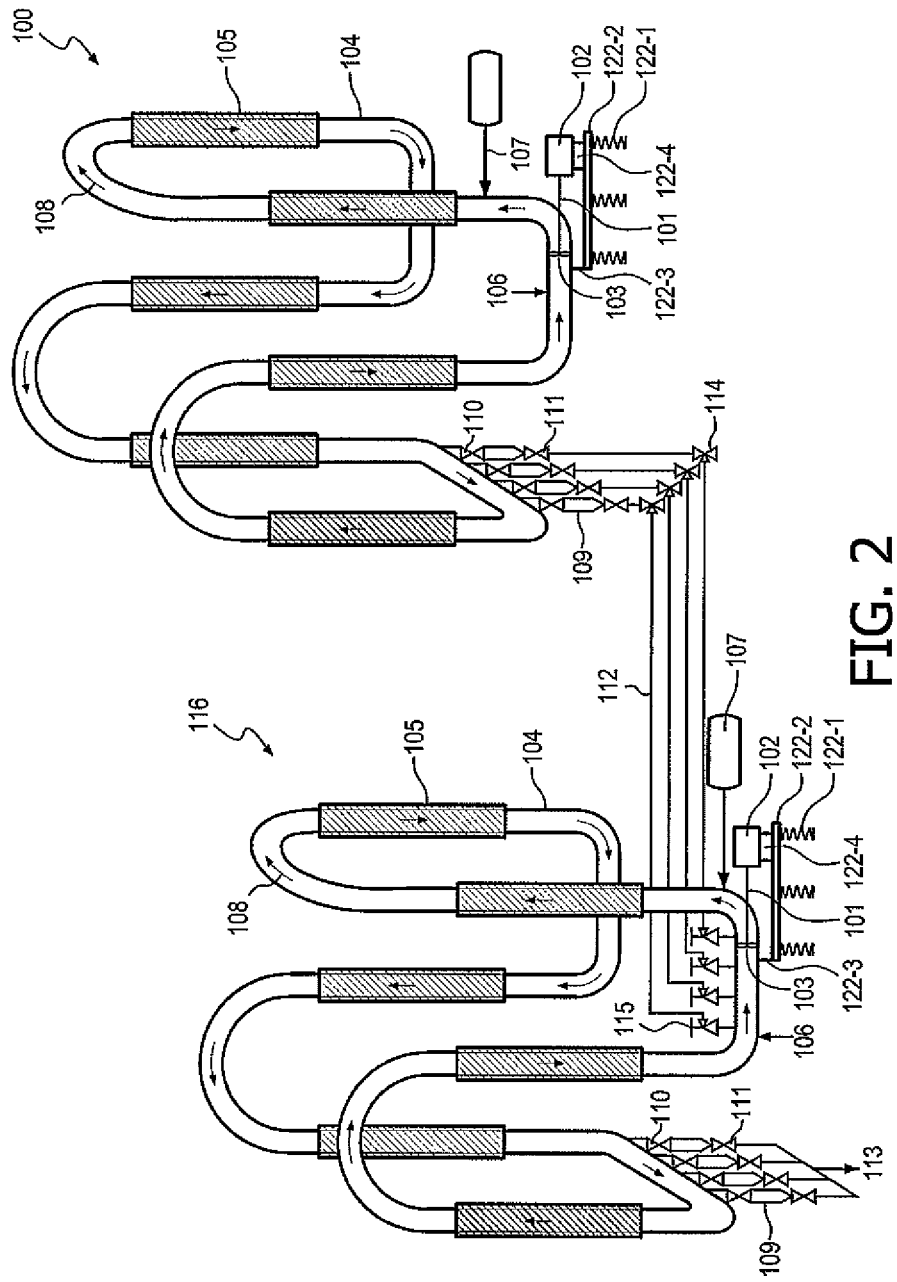
FIG. 2 schematically illustrates a double loop reactor with two serially-connected loop reactors with a pump according to an embodiment of the present invention.

FIG. 2 shows a preferred polymerization reactor according to an embodiment of the present invention with two single loop reactors 100, 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. The catalyst and optionally the activation agent, may be fed in one or both reactors 100 and 116 by means of conduct 106. The polymerization slurry is directionally circulated throughout the loop reactors 100, 116 as illustrated by the arrows 108 in the reactor path by one or more pumps, such as axial flow pump 101. The pump 101 may be powered by an electric motor 102. The pump 101 may be provided with a set of rotating impellers 103. Spring supported frame 122 comprises springs 122-1, a frame 122-2, a reactor connection 122-3 and a motor connection 122-4. Springs 122-1 are located below frame 122-2 and are connected to the bottom of frame 122-2. The reactors 100, 116 are further provided with one or more settling legs 109 connected to the pipes 104 of the reactors 100, 116. The settling legs 109 are preferably provided with an isolation valve 110. Further, the settling legs can be provided with product take off or discharge valves 111 or can be in direct communication with the downstream section. Downstream, the exit of the settling leg 109 of reactor 100, a transfer line 112 is provided that allows for transfer of the polymer slurry settled in the settling legs 109 to the other reactor 116 through a piston valve 115. Along transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

The invention will now be illustrated by the following non-limiting example.

EXAMPLE

In this example two serially connected reactors for example as illustrated in FIG. 2 were fitted with two standard pumps each having a four-bladed aluminum impeller with spring supported frame. Bimodal polyethylene was prepared in the double loop reactor in the presence of a particulate metallocene catalyst with a particle size of around 40 μm.

Subsequently, the reactor was shut down and the pumps in both reactors were replaced with pumps having six bladed impellers and a spring supported frame according to an embodiment of the invention. The pumps were set at 1485 rpm, the blade angle was about 25°, the size of the blade was approximately 95% of the tube inner diameter and the flow rate of the slurry was about 5250 m$^3$/h. In both experiments, the pressure in the reactor was kept at 42 barg, the reactor path length was approximately 110 meter, the tube inner diameter was approximately 0.5 meter. Bimodal polyethylene was prepared in the double loop reactor in the presence of a particulate polymerization catalyst with a particle size of around 40 μm.

Figure 3:
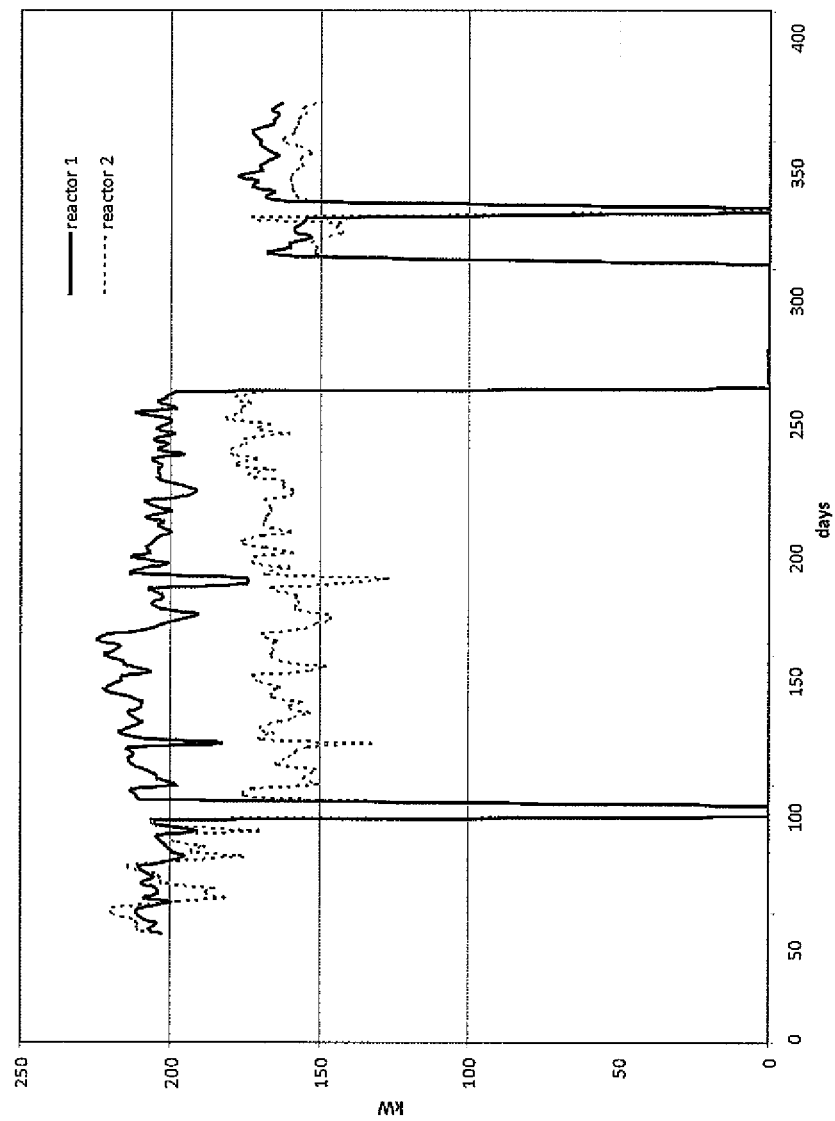
FIG. 3 represents a graph showing energy consumption of a four bladed (left side) and a pump according to an embodiment of the invention (right side).

Surprisingly, while the produced polyethylene was of comparable high quality with a density of approximately 0.9235 g/cm$^3$, it was found that replacement of the four-bladed pump by the six-bladed pump according to the invention to circulate this complex slurry mixture, resulted in approximately a 20% lower energy consumption in comparison to the polymerization reaction wherein the standard 4-bladed pumps were used. FIG. 3 shows the energy consumption (in kW on the Y-axis) in time (in months on the X-axis) before (left side) and after (right side) installation of the six-bladed impeller according to the invention. The diagonal lines indicate reactor shut down.

After replacement, a 20% reduction (on average) in energy consumption was observed. The top line is the energy consumption of the pump in the first reactor. The bottom line is the energy consumption of the pump in the second reactor. It will be understood that the energy consumption of the pump is different in both reactors due to the different conditions in each. It can be concluded that the present invention allows for preparation of polyethylene of high quality from complex slurry mixtures while leading to lower energy consumption.

What is claimed:

1. A method comprising: circulating an olefin polymerization slurry through a loop reactor using an axial pump for the production of polyolefin, wherein the olefin polymerization slurry comprises olefin monomer, diluent and a polymerization catalyst, wherein said axial pump comprises an impeller consisting of 6 blades, and wherein said axial pump is fixed on a spring supported frame.

2. The method according to claim 1, wherein said blades have a blade angle ranging between 24° and 26°.

3. The method according to claim 1, wherein said blades are made of inox.

4. The method according to claim 1, wherein said polyolefin is polyethylene.

5. A method for producing polyolefin in a loop reactor, comprising the steps of:
    (a) feeding olefin monomer, a diluent, and at least one polymerization catalyst to said loop reactor to produce a polymerization slurry;
    (b) polymerizing said olefin monomer in said loop reactor to produce a polyolefin,
    wherein said polymerization slurry is circulated through said loop reactor by means of an axial pump comprising an impeller consisting of 6 blades, and wherein said axial pump is fixed on a spring supported frame.

6. The method according to claim 5, wherein said blades have a blade angle ranging between 24° and 26°.

7. The method according to claim 5, wherein said blades are made of inox.

8. The method according to claim 5, wherein said polyolefin is polyethylene.

9. A loop reactor for the production of polyolefin, wherein said loop reactor comprises:
    a plurality of interconnected pipes defining a flow path for a polymerization slurry, said polymerization slurry comprising olefin monomer, optionally one or more co-monomer(s), a polymerization catalyst, optionally an activating agent, and diluent;
    means for feeding monomer and diluent in the loop reactor;
    means for feeding polymerization catalyst in the reactor;
    optionally means for feeding an activating agent in the reactor; and
    a pump suitable for maintaining the polymerization slurry in circulation in said loop reactor, wherein said pump is an axial pump with an impeller consisting of 6 blades, and wherein said pump is fixed on a spring supported frame.

10. The loop reactor according to claim 9, wherein said blades have a blade angle ranging between 24° and 26°.

11. The loop reactor according to claim 9, wherein said blades are made of inox.

12. The loop reactor according to claim 9, wherein said polyolefin comprises polyethylene.

* * * * *